Sept. 7, 1943. S. S. BARKER 2,328,770
PROCESS FOR PICKING CHICKENS AND APPARATUS THEREFOR
Filed Sept. 2, 1941
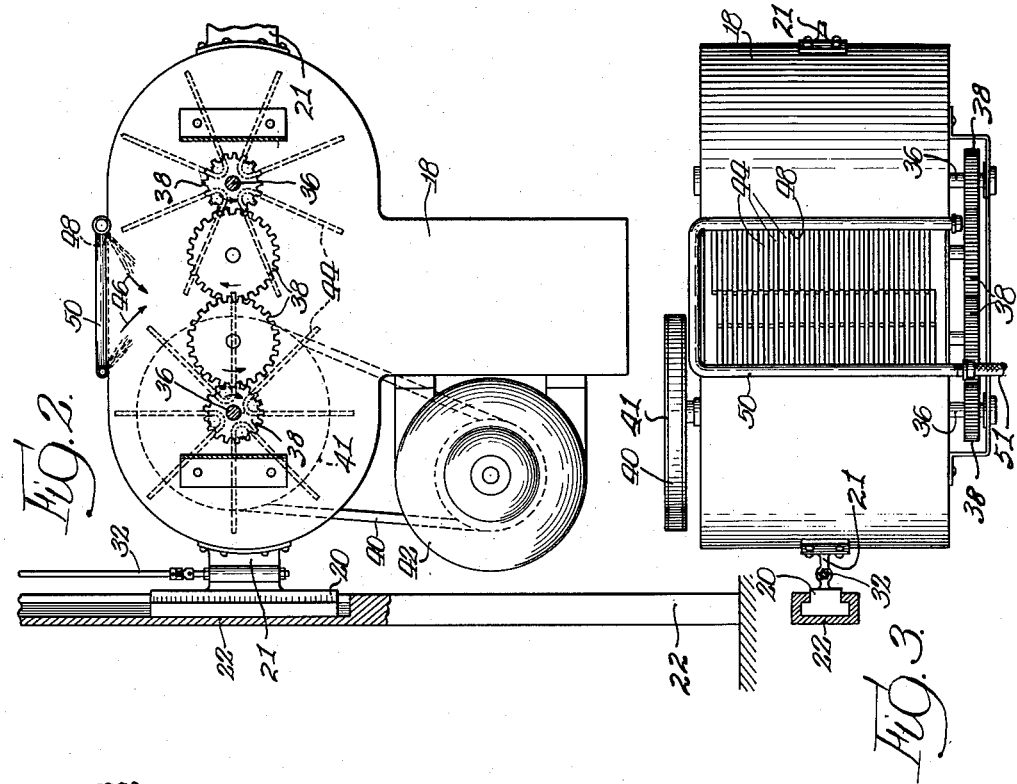
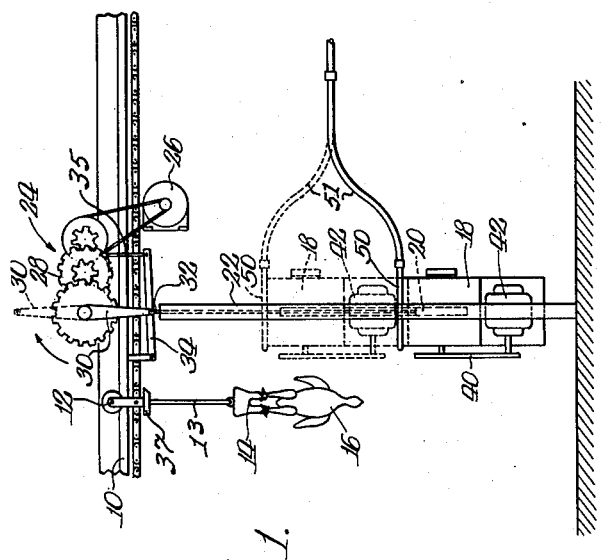
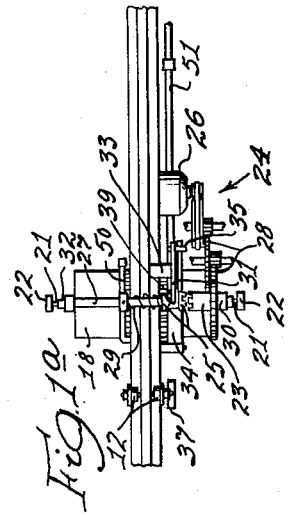
INVENTOR.
Seth S. Barker.
BY Bair & Freeman
attys.

Patented Sept. 7, 1943

2,328,770

UNITED STATES PATENT OFFICE 2,328,770

PROCESS FOR PICKING CHICKENS AND APPARATUS THEREFOR

Seth S. Barker, Ottumwa, Iowa

Application September 2, 1941, Serial No. 409,249

6 Claims. (Cl. 17—11.1)

My invention relates to a process for removing the feathers from chickens or similar fowls, and to apparatus for carrying out the process.

More specifically, the process of my invention provides for rapid and efficient picking of chickens in a manner which is adapted to fit in with present day requirements in poultry picking plants where the birds are carried on overhead conveyors, and where many of the processing operations are performed by automatic machinery.

An object of my invention is to provide automatic means for picking the feathers from a chicken as the fowl is moved in a horizontal direction, supported from an overhead trolley conveyor.

A further object is to perform the picking speedily and thoroughly, the speed being important in order that it shall not be necessary to slow down the movement of the conveyor.

A more particular object is to accomplish the picking in a brief interval of time, but without rough or violent treatment which might damage the fowl or otherwise render it unsuitable for market.

Another object is to provide a picking process, and apparatus therefor, which shall be well adapted to convenient collection and disposal of the feathers, making a minimum of litter in the poultry dressing room.

With these and other objects in view, my invention consists in the details of procedure involved in the practice of my method, and in the construction, arrangement and combination of the various parts of the apparatus therefor, whereby the objects contemplated are attained, as hereinafter more fully set forth, pointed out in my claims and illustrated in the accompanying drawing, in which:

Figure 1 represents a general elevational view looking at right angles to the line of the conveyor.

Figure 1ᵃ is a top view of Figure 1;

Figure 2 is an enlarged elevational view, looking along the line of the conveyor, and Figure 3 is a top view of the picking apparatus.

In the accompanying drawing I have used the reference numeral 10 to indicate the conveyor line along which trolleys 12 are propelled at a uniform rate. Each trolley carries a shackle 14 on which a chicken or other fowl 16 is carried in head down position. The shackle 14 is suspended by a rod or chain 13.

The numeral 18 designates an enclosing tank or housing for the picking rotors. The housing 18 is supported on two cross head blocks 20 each having a supporting arm or bracket 21 attached to the housing. The cross head blocks 20 slide in vertical guides 22 which may be fixed to the floor or otherwise suitably supported. At the top of the guides 22 I mount a crank assembly 24 consisting of a motor 26 driving a train of reducing gears 28, and cranks 30 on the shaft of the last gear. The cranks 30 are connected to the cross head blocks 20 by connecting rods, cables or chains 32. The crank assembly 24 is provided either with a clutch or with a limit switch device, operated by the contact bar 34, so that each trolley 12 as it comes over the tank 18 causes the crank 30 to make one complete revolution and then stop. As a diagrammatic illustration of this type of clutch I show, in Figure 1ᵃ, a clutch member 23 continuously driven by the slowest speed gear 28 and a cooperating clutch member 25 slidably and non-rotatably keyed on the shaft 27 to which the cranks 30 are secured. A spring 29 tends to engage the clutch member 25 with the clutch member 23, but the clutch member 25 is normally retained disengaged by a lever 31. This lever is pivoted to a bracket 33 and is connected by a link 35 with the bar 34. A shoe 37 on the trolley 12 depresses the bar 34 until the shoe passes over a shoulder 39 of the bar, and this raises the left end of the lever 31 so that the clutch members are permitted to engage. After the shoe 37 passes the shoulder 39 the bar 34 is swung upwardly by means of a spring or the like (not shown), and a cam on the clutch member 25 effects disengagement of the clutch. This construction is similar to a punch press clutch. The crank is arranged so that in its normal inoperative position it rests at the lowest point in its stroke, as shown in full lines in Figure 1. The tank 18 supported thereby will then be low enough so that the fowl may pass over it.

Inside the tank I mount two horizontal parallel shafts 36 which may be connected by gears 38 and driven by a pulley 41 on one of the shafts. A belt 40 drives the pulley 41 from a motor 42. Inside the tank the shafts carry elongated hubs in which are mounted long fingers or whips 44 of rubber, leather or similar material. These fingers are relatively long and narrow, and of such size that they are ordinarily not quite self supporting when at rest, but would droop or hang down somewhat. When the shafts 36 are rotated at high speed, however, the fingers will be held out by centrifugal force in the positions shown, for example, in Figure 2. The length of the fingers, with reference to the spacing between the shafts 36, is such that the fingers on the two shafts will interlap somewhat when they are thrown into radial position by centrifugal force. The direction of rotation of the shafts is such that the fingers on each shaft are moving downwardly at the point where they interlap with the fingers on the other shaft, as indicated by the arrows at 46 in Figure 2.

I form an opening 48 in the top of the tank 18 and surround this opening with a perforated spray pipe 50, the spray openings being so arranged that the jets are directed downwardly into the tank.

The picking apparatus is located directly beneath the conveyor, with the shafts 36 parallel to the conveyor line. Just as a trolley carrying a chicken comes into position over the opening 48, it causes the crank operating mechanism to be tripped so that the cranks 30 make a complete revolution or cycle. The rotation of the cranks, of course, raises the tank 18 by sliding the cross head blocks 20 in the guides 22 up to the point where the fowl is brought between the rapidly rotating picking rotors. As shown in Figure 1, the upward extreme of the movement should be such that the largest part of the body of the fowl goes below the center of the picking drums. It should be noted that immediately the head of the fowl is engaged by the rotors, the fowl is stretched out tightly, because of the tension caused by the engagement of the downwardly moving fingers. This helps to keep the fowl lined up and steady on the trolley, while the tank 18 and the picking rotors are moving upwardly over the fowl, and down again as the cranks approach the end of their revolution. I have found by experiment that the long limber fingers on a small diameter hub, turning at high speed, do a very complete job of picking in one passage, as the fingers pass in and around the legs, wings and different points of the body.

The use of small limber picking fingers, requiring centrifugal force to hold them out from the hub at the point where they engage the fowl, has been found to contribute much to quick and thorough picking, with a minimum of injury to the fowl. High speed rotation of the shafts 36 is necessary, and the rapid succession of strokes by the whip-like fingers gives the desired result without abrading the skin or bruising the flesh of the fowl.

The spray pipe 50 is connected by a flexible hose 51 to the water supply, so that the vertical movement of the tank 18 need not interfere with the spray process.

The fowl is almost completely enclosed while the picking operation is taking place, so that any unsightly spreading of feathers is avoided. They are all collected inside the tank 18 and are continually washed off the fowl and the picking rotors by the jets from the spray pipe 50. Vertical movement of the picking apparatus makes it possible to locate the opening in which the fowl is received in the top of the housing, this being the place where there is the least likelihood of water and feathers being thrown out to litter the floor of the processing room. Any suitable drain or clean-out means may be provided in the bottom of the tank for taking care of the water and wet feathers.

By the procedure and apparatus just described, the chicken picking can be carried out as the chicken moves along the conveyor in the ordinary manner.

Some changes may be made in the details of procedure involved in the practice of my method, and in the construction and arrangement of the parts of the apparatus which I have invented for carrying out the method without departing from the real spirit and purpose of my invention, and it is my intention to cover by my claims any variant modes of procedure and any modified forms of structure, or use of mechanical equivalents, which may be reasonably included within their scope.

I claim as my invention:

1. In poultry picking apparatus for use beneath an overhead conveyor on which the poultry is carried, a framework mounted for vertical sliding movement, rotating picking means carried by said framework, and elevator means actuated by the passage of fowl carrying means on the conveyor to raise said framework, bringing said picking means into engagement with the fowl.

2. A poultry picking machine for use beneath an overhead conveyor, consisting of a pair of oppositely-rotated picking rotors, and means adapted to raise said picking rotors into engagement with a fowl carried on said conveyor, and then to lower said rotors out of engagement with said fowl.

3. The process of poultry picking consisting of suspending a fowl from a horizontally moving conveyor, passing the fowl thus suspended over a picking machine, raising the picking machine to encompass the fowl, and lowering the picking machine to permit the fowl to pass on down the conveyor line.

4. In a picking machine, means for supporting a series of fowl holders for substantially horizontal traveling movements, a picking mechanism below the path of travel of the supporting means, and means periodically raising and lowering the picking mechanism for successively picking fowls on the holders.

5. In a poultry picking machine, conveyor means including a plurality of fowl holders moving fowls horizontally, a picker mechanism below the path of travel of said conveyor means, said mechanism consisting of rotating drums having relatively long narrow whip-like fingers thereon, said fingers being of such flexibility as to droop or hang down when at rest, but adapted to extend radially under the influence of centrifugal force when said drums are rotated at high speed, and means intermittently raising said mechanism to a point where the centers of the drums are above the largest part of the body of a fowl.

6. In poultry picking apparatus for use beneath an overhead conveyor on which the poultry is carried, a framework mounted for vertical sliding movement, picking rotors carried in adjacent relation by said framework, means rotating said rotors so that their adjacent sides turn downward, means actuated by the passage of fowl carrying means on the conveyor to raise said framework, bringing said picking means into engagement with the fowl, and two rows of spray jets, one row above each of said rotors, moving with said framework, and directing water onto the downwardly moving portions of said rotors.

SETH S. BARKER.